May 13, 1958 J. E. BEBINGER 2,834,554
SPLASH GUARD FOR FOOD WASTE DISPOSER
Filed Oct. 31, 1955 2 Sheets-Sheet 1

Inventor
Jack E. Bebinger
by Andrew B. Hubbard
Attorney

May 13, 1958 J. E. BEBINGER 2,834,554
SPLASH GUARD FOR FOOD WASTE DISPOSER
Filed Oct. 31, 1955 2 Sheets-Sheet 2

Inventor
Jack E. Bebinger
by Andrew B. Hubbard
Attorney

United States Patent Office 2,834,554
Patented May 13, 1958

2,834,554

SPLASH GUARD FOR FOOD WASTE DISPOSER

Jack E. Bebinger, Brookfield, Ill., assignor to General Electric Company, a corporation of New York Application October 31, 1955, Serial No. 543,750

2 Claims. (Cl. 241—100.5)

This invention relates to food waste disposers and, in particular, to a flexible entrance guard member which permits ready entrance of the food waste into the comminution chamber, effectively resists the outward projection of water and food waste fragments during the comminution operation, and acts as a sound insulator to reduce the noise level of the operation of the machine.

Food waste disposers are ordinarily mounted in the drainage opening of a kitchen sink, and are of course connected to the plumbing waste line. Food waste is passed into a comminution chamber through an entrance throat and is reduced to small particle size by comminution elements operating within the chamber. This operation is conducted in the presence of a continuous flow of cold water, which ordinarily is obtained by letting the water run from an open tap at the sink. The slurry of finely ground waste and water discharges from the comminution chamber into the plumbing waste system.

Where once it was almost the universal practice to utilize a locking type stopper at the entrance to the comminution chamber to prevent access to the chamber during the operation of the disposer, it is now popular to use "continuous feed" disposers into which food waste may be fed while the comminution devices are in operation. Because of the violent action within the comminution chamber, it is necessary to provide a guard to prevent water from splashing out of the chamber, and to hold back particles of food waste from being thrown from the chamber, and for that purpose flexible rubber guard means have been devised. These guard means have flexible finger portions which normally extend across the entrance throat to the chamber but part or flex to permit the passage of food waste into the chamber. The advantages of continuous feed are seriously offset by the increase in the noise of operation of the disposer because the guard offers practically no obstruction or insulation against the passage of sound. In the locking cover type, the fixed closure and the flow of water therethrough formed an effective sound barrier, but the continuously open rubber guard member type is obviously a far less efficient sound insulator.

I have found that the rubber closure may be used effectively to reduce the passage of sound therethrough by arranging the closure to retain a substantial quantity of the water flowing into it from the sink. In one aspect of the invention, I construct the rubber guard so that it has a concave upper surface which extends entirely across the entrance to the comminution chamber. The guard is split radially to provide narrow slits through which the water may enter the chamber. These slits define the boundaries of fingers or sectors which flex to permit the passage of food waste but are sufficiently stiff to close immediately thereafter and not flex substantially under the flow or presence of water therein. By opening the sink tap to cause a flow of water into the sink at a slightly faster rate than it passes through the guard into the comminution chamber, a layer of water having a maximum depth of about one-half inch will be retained in the guard. Said water layer forms an effective barrier against the passage of sound. In addition, the convex surface presented by the guard to the interior of the chamber and the narrow slits provided in the guard provide an efficient blocking device against the accidental discharge of waste fragments and splashing water.

It is therefore an object of the invention to provide a food waste disposer splash guard which will permit the ready passage of food waste into the comminution chamber, give improved protection against the escape of water and food fragments therefrom during the operation of the disposer, and provide effective sound insulation.

In the accompanying drawings:

Fig. 1 is a side elevation, partly in section, showing a food waste disposer embodying the present invention, and showing particularly the passage through the guard of a large article of waste such as a corn cob or the like;

Figs. 1 and 1a show a food waste disposer of the type in general use in domestic installations, as distinguished from those employed in restaurants or other commercial establishments. The present invention is of course applicable to either type.

Figure 1:
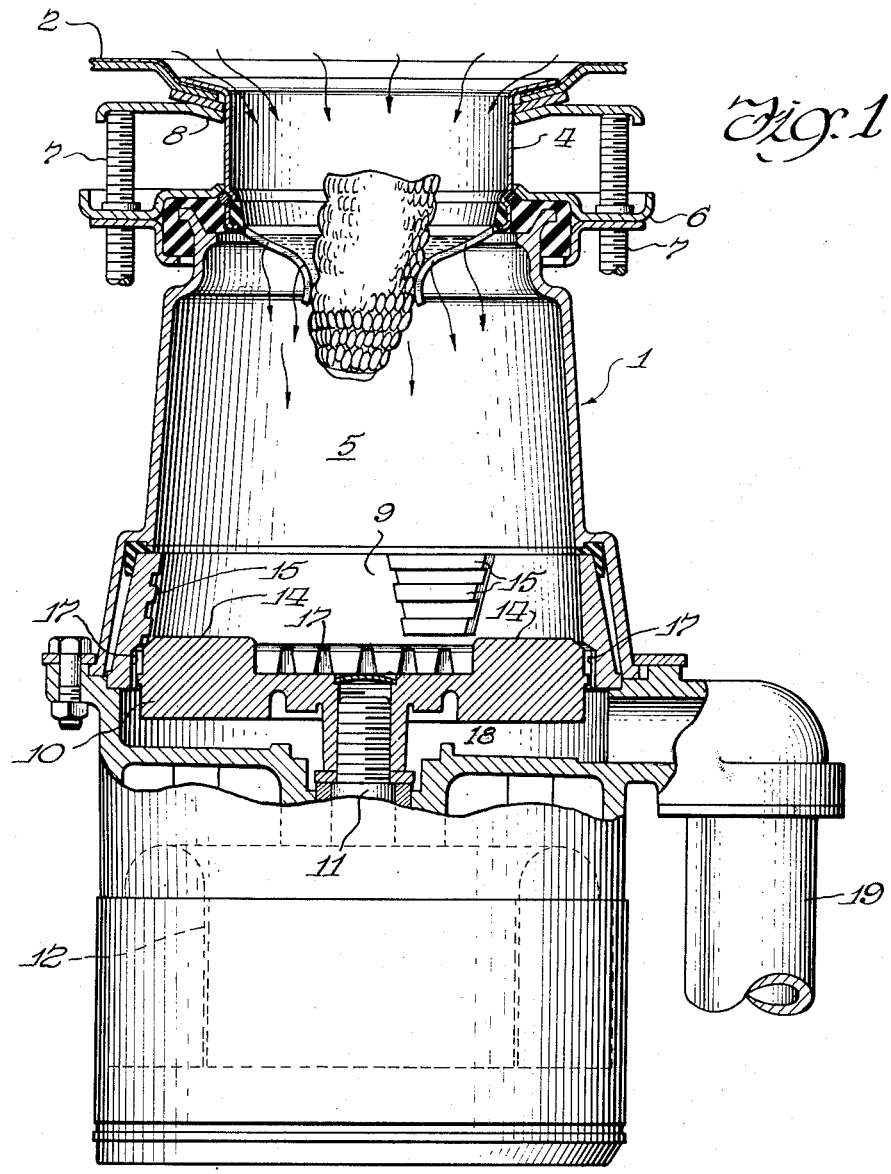

The food waste disposer 1 is affixed to the basin 2 of a kitchen sink 3 by means of what is known in the art as a "sink flange" although it actually comprises a flanged sleeve 4 which fits within the sink drainage opening and forms a throat through which waste material may be fed into the comminution chamber 5 of the disposer. The illustrated attachment means comprises a cushion-mounted flange 6 about the top of the comminution chamber and accommodating mounting studs 7 which press a flange 8 against the underside of the sink, whereby the disposer is tightly clamped in position. Gaskets and the like may be used where necessary or desirable.

Figure 1A:
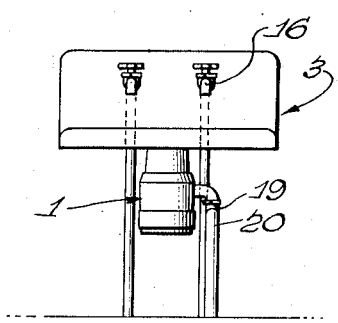
Fig. 1a is an elevation showing the disposer attached to a kitchen sink having conventional water taps.

The disposer further includes a hardened shredder ring 9 about the base of the comminution chamber and a rotatable comminution element 10 which in effect forms the bottom of the chamber. The comminution element is mounted on the end of a motor shaft 11 for rotation by the motor 12. The comminution element is a relatively heavy disk and has a substantial flywheel effect. In the embodiment shown, the element 10 has integral, diametrically opposed members 14 which hurl the waste material violently about the chamber 5 and cause it to strike the cutting and abrading elements 15 which project into the chamber from the shredder ring. This action is carried out in the presence of water flowing into the chamber from the sink. The waste material is reduced to small particle size and flows with the water stream through ports 17 into a drainage chamber 18 and then into the tail piece 19 which connects to the plumbing trap 20 (Fig. 1a) serving the plumbing waste system (not shown) of the building.

As previously noted, the disposer is adapted to continuous feed and is therefore provided with means permitting the passage of food waste into the chamber while nevertheless forming a guard to prevent water or food waste fragments from being thrown out of the chamber by reason of the violent action therein. It is common in the art to use a flat rubber guard, formed with a plurality of fingers which flex to permit the entry of food waste and have rather large radial or central openings which permit free water flow into the chamber. Such a guard, for example is as shown in Jordan 2,670,143, granted February 23, 1954. It will be understood that in the operation of the disposer, water is running into the sink at a substantial flow rate, whereupon water enters the sleeve 4 from various parts of the sink bowl, as suggested by the arrows in Fig. 1, and enters the chamber 5 through the guard means 21, as presently described.

Figure 2:
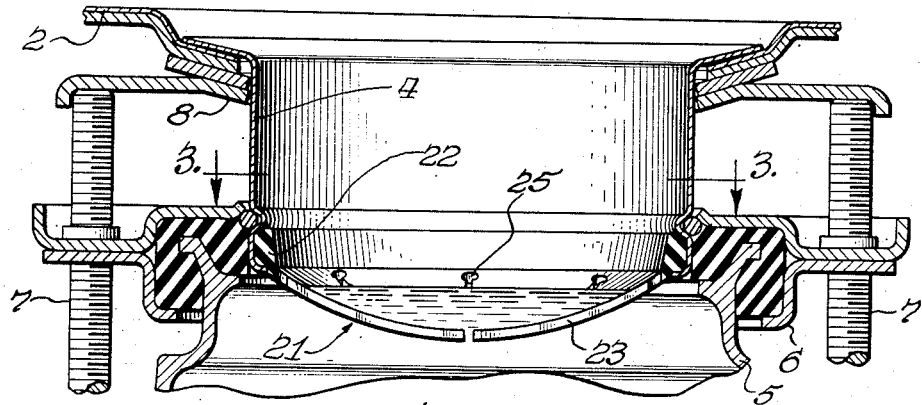
Fig. 2 is an enlarged sectional view of the entrance assembly for the waste disposer.
Figure 3:
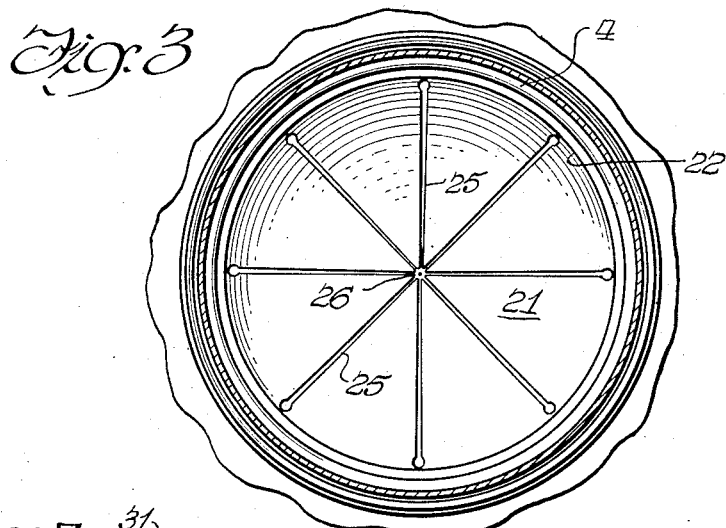
Fig. 3 is a plan view in section on lines 3—3 of Fig. 2.

In a preferred form as shown in Fig. 2, the splash guard 21 of the present invention comprises a concave rubber member, having a relatively heavy rim 22 which fits snugly about the bottom wall of the sink flange 4. The body portion 23 of the guard completely spans the lower portion of the flange 4 so as effectively to provide a closure for the entrance to the comminution chamber 5. As best shown in Fig. 3, the body portion of the guard is subdivided into a plurality of triangular sectors by the narrow slits 25 which extend radially from a central opening 26 which, as is apparent from Fig. 3, is very small in comparison with the diameter of the body portion. The inherent rigidity of the concave configuration and the narrow slits and small openings at the extremities of said slits sufficiently retard the flow of water into the comminution chamber to cause the guard to accumulate a volume of water, as indicated in Fig. 2, when water is flowing from the sink tap 16 during the operation of the disposer. Performance tests indicate that there should preferably be no more than eight of the triangular sectors, and that the body portion should be not materially less than three sixty-fourths of an inch thick to insure a sufficient balance between resiliency and stiffness to have the sectors return to the Fig. 2 position for the support of accumulated water even after having been distorted sufficiently to pass a large article such as the corn cob shown in Fig. 1. The maximum depth of the guard, measured from the plane of the base of the rim 22, is preferably about one-sixth of the diameter; in a domestic food waste disposer, the standardized sink drain opening results in a guard diameter of of about three inches, and a maximum depth of about one-half inch.

Figures 4, 5:
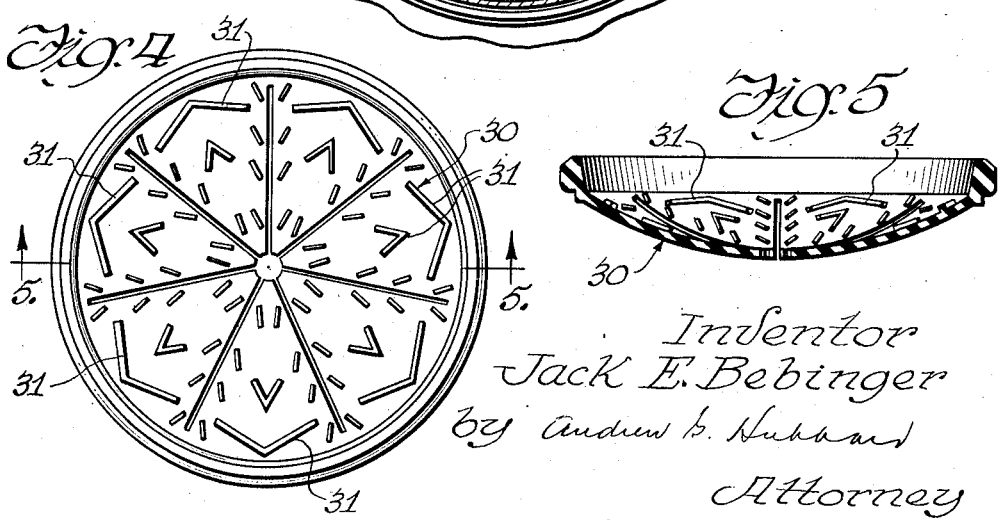
Fig. 4 is a plan view of a second form of splash guard.
Fig. 5 is a sectional elevation taken through lines 5—5 of Fig. 4.

The embodiment of Figs. 4 and 5 is essentially similar to that above described. The splash guard is formed however with a multiplicity of embossed ribs or baffles 31 of various sizes and angular disposition relative to the slits 25 to increase the resistance to upward flexing of the segments and to slow the drainage of water through the slit-like passages.

In each embodiment, the entry of water into the sleeve 4 from all sink areas about the sleeve reduces the likelihood of any concentrated water flow against any of the portions of guard 21. The sectors of the guard 21 therefore are of adequate rigidity to support the accumulated water. The flow passages between the sectors permit the entry of water into the comminution chamber in sufficient volume to carry out the comminution operation in the presence of water. This is essential in order to prevent clogging of the waste lines, as is now well known. The convex front which the guard means presents to the interior of the chamber improves the resistance to outward passage of water splashes and water fragments by increasing the resistance to outward flexing of the triangular segmental portions thereof, and by the accumulation of water within the guard. Additionally and importantly, the splash guard, by limiting water flow into the chamber sufficiently to permit the accumulation of a substantial body of water, blankets the opening of the chamber 5 against the passage of sound therethrough.

While there have been described what are at present considered to be the preferred embodiments of the invention, it will be understood that various modifications may be made therein, and it is intended to cover in the appended claims all such modifications as fall within the scope of the invention.

I claim:

1. A food waste disposer comprising in combination, a comminution chamber, means including a sleeve member secured to said chamber and providing an entrance for the introduction of food waste thereto, means for securing said sleeve member about an opening of a kitchen sink for the flow of water from said sink into said chamber, means within said chamber for comminuting material contained therein in the presence of water entering said chamber from said sink, means for discharging the mixture of comminuted waste and water, and guard means disposed within said sleeve above said chamber, said guard means extending entirely across said sleeve and including a spherical body portion of flexible sheet material disposed with the concave side thereof facing the inlet end of said sleeve, said body portion being subdivided, by narrow slit-like water passages extending radially from a very small opening at the center of said body portion to near the rim thereof, into a plurality of imperforate triangular sectors which are distortable to permit passage of waste material into said chamber but restore to original concavo-convex condition to provide a cup-like device to restrict the passage of water into said chamber to substantially the flow capacity of said slits and said opening, whereby upon flow of water into said sleeve member from said sink at a rate faster than said flow capacity a volume of water will accumulate in said spherical body portion to provide a sound insulation medium during the operation of said disposer.

2. A food waste disposer according to claim 1 in which said concave body portion surface is formed with a plurality of upstanding ridges in angular relation to said radially extending water passages.

References Cited in the file of this patent

UNITED STATES PATENTS

| 2,232,382 | Graze | Feb. 18, 1941 |
| 2,342,495 | Sacco | Feb. 22, 1944 |
| 2,573,213 | Miller | Oct. 30, 1951 |
| 2,670,143 | Jordon | Feb. 23, 1954 |
| 2,730,308 | Jordan | Jan. 10, 1956 |